(12) United States Patent
Pisklak et al.

(10) Patent No.: US 11,512,240 B2
(45) Date of Patent: Nov. 29, 2022

(54) GEOPOLYMER CEMENT COMPOSITIONS AND METHODS OF USE

(71) Applicant: HALLIBURTON ENERGY SERVICES, INC., Houston, TX (US)

(72) Inventors: Thomas Jason Pisklak, Cypress, TX (US); Sam Jason Lewis, Spring, TX (US); Paul Joseph Jones, Houston, TX (US); Stephanie Ruiz, Spring, TX (US); William Cecil Pearl, Jr., Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 338 days.

(21) Appl. No.: 16/491,528

(22) PCT Filed: Dec. 3, 2018

(86) PCT No.: PCT/US2018/063535
§ 371 (c)(1),
(2) Date: Sep. 5, 2019

(87) PCT Pub. No.: WO2020/117185
PCT Pub. Date: Jun. 11, 2020

(65) Prior Publication Data
US 2021/0253933 A1 Aug. 19, 2021

(51) Int. Cl.
*E21B 33/14* (2006.01)
*C09K 8/467* (2006.01)
(Continued)

(52) U.S. Cl.
CPC ............ *C09K 8/487* (2013.01); *C04B 14/106* (2013.01); *C04B 20/1074* (2013.01);
(Continued)

(58) Field of Classification Search
CPC ..... C09K 8/487; C04B 12/005; C04B 14/044; C04B 14/106; C04B 14/4662;
(Continued)

(56) References Cited

U.S. PATENT DOCUMENTS 5,741,357 A * 4/1998 Sheikh .................. C04B 22/008
428/404
7,794,537 B2 9/2010 Barlet-Gouedard et al.
(Continued)

FOREIGN PATENT DOCUMENTS

WO WO 2014/053699 A1 4/2014
WO WO 2020/117188 A1 6/2020
(Continued)

OTHER PUBLICATIONS

J. Davidovits; "Geopolymers: Inorganic Polymeric New Materials"; Journal of Thermal Analysis, vol. 37, pp. 1633-1656 (1991).
(Continued)

*Primary Examiner* — Angela M DiTrani Leff
(74) *Attorney, Agent, or Firm* — Conley Rose, P.C.; Rodney B. Carroll

(57) ABSTRACT

Methods of cementing include providing a geopolymer cement composition that includes a monophase amorphous hydraulic binder material (MAHBM), a metal silicate, an alkaline activator, and a carrier fluid, introducing the geopolymer cement composition into a subterranean formation, and allowing the geopolymer cement composition to set in the subterranean formation. The MAHBM includes silica or alumina core particulates coated with an amorphous calcium silicate hydrate.

18 Claims, 2 Drawing Sheets

(51) Int. Cl.
*C09K 8/487* (2006.01)
*C04B 14/10* (2006.01)
*C04B 20/10* (2006.01)
*C04B 22/06* (2006.01)
*C04B 28/26* (2006.01)

(52) U.S. Cl.
CPC ............ *C04B 22/062* (2013.01); *C04B 28/26* (2013.01); *E21B 33/14* (2013.01)

(58) Field of Classification Search
CPC ............ C04B 20/1074; C04B 20/1081; C04B 22/062; C04B 28/006; C04B 28/26; C04B 41/5077; E21B 33/14
See application file for complete search history.

(56) References Cited

U.S. PATENT DOCUMENTS

| | | | |
|---|---|---|---|
| 8,226,763 | B2 | 7/2012 | Beuchle et al. |
| 8,226,764 | B2 | 7/2012 | Beuchle et al. |
| 8,382,892 | B2 | 2/2013 | Beuchle et al. |
| 10,077,212 | B2 | 9/2018 | Muthusamy et al. |
| 2008/0028995 | A1* | 2/2008 | Barlet-Gouedard ... C09K 8/467 106/811 |
| 2010/0095871 | A1 | 4/2010 | Patil et al. |
| 2011/0041737 | A1* | 2/2011 | Beuchle ................ C04B 7/3453 106/739 |
| 2015/0114640 | A1* | 4/2015 | Bestaoui-Spurr ........ C09K 8/62 507/274 |
| 2016/0214901 | A1* | 7/2016 | Muthusamy ............. C09K 8/08 |
| 2017/0057872 | A1 | 3/2017 | Easton et al. |
| 2017/0349485 | A1* | 12/2017 | Horta ........................ C04B 7/43 |
| 2021/0332284 | A1* | 10/2021 | Pisklak .................. C04B 28/24 |
| 2021/0363403 | A1* | 11/2021 | Pisklak .................. C04B 28/08 |
| 2021/0403791 | A1* | 12/2021 | Pearl, Jr. ................ C04B 28/24 |

FOREIGN PATENT DOCUMENTS

| | | |
|---|---|---|
| WO | WO 2020/117190 A1 | 6/2020 |
| WO | WO 2020/117191 A1 | 6/2020 |
| WO | WO 2020/117192 A1 | 6/2020 |

OTHER PUBLICATIONS

Dinesh Kanesan et al; IOP Conf. Series: Materials Science and Engineering 201 (2017) 012014; "Formulation of geopolymer cement using mixture of slag and class f fly ash for oil well cementing".

International Search Report and Written Opinion issued for International Patent Application No. PCT/US2018/063535, dated Aug. 28, 2019, 11 pages, ISA/KR.

Extended European Search Report for European Patent Application No. 18942252.0 issued by the European Patent Office, dated May 23, 2022, (8 pgs.).

* cited by examiner

GEOPOLYMER CEMENT COMPOSITIONS AND METHODS OF USE

CROSS-REFERENCE TO RELATED APPLICATION

The present application is a U.S. National Stage patent application of International Patent Application No. PCT/US2018/063535, filed on Dec. 3, 2018, the benefit of which is claimed and the disclosure of which is incorporated herein by reference in its entirety.

BACKGROUND

The present disclosure generally relates to compositions and methods for cementing operations. In particular, the present disclosure relates to geopolymer cement compositions that include a monophase amorphous hydraulic binder material (MAHBM), wherein the MAHBM includes core particulates coated with a calcium silicate hydrate (e.g., dicalcium silicate hydrate ($C_2SH$) or tricalcium silicate hydrate).

In cementing operations, such as well construction and remedial cementing, cement compositions are commonly utilized. Cement compositions may be used in primary cementing operations whereby pipe strings, such as casing and liners, are cemented in wellbores. In a typical primary cementing operation, a cement composition may be pumped into an annulus between the walls of the wellbore and the exterior surface of the pipe string disposed therein. The cement composition may set in the annular space, thereby forming an annular sheath of hardened, substantially impermeable material (e.g., a cement sheath) that may support and position the pipe string in the wellbore and may bond the exterior surface of the pipe string to the wellbore walls. Among other things, the cement sheath surrounding the pipe string should function to prevent the migration of fluids in the annulus, as well as protecting the pipe string from corrosion. Cement compositions also may be used in remedial cementing methods, such as in the placement of plugs, and in squeeze cementing for sealing voids in a pipe string, cement sheath, gravel pack, subterranean formation, and the like. Cement compositions also may be used in surface applications.

A particular challenge in cementing operations is the development of satisfactory mechanical properties in a settable composition within a reasonable time period after placement in the subterranean formation. During the life of a well, the subterranean cement sheath undergoes numerous strains and stresses as a result of temperature effects, pressure effects, and impact effects. The ability to withstand these strains and stresses is directly related to the mechanical properties of the settable composition after setting. The mechanical properties are often characterized using parameters such as compressive strength, tensile strength, Young's Modulus, Poisson's Ratio, elasticity, and the like.

Thus, there is a continuing need for improved cement compositions and methods.

BRIEF DESCRIPTION OF THE DRAWINGS

The following figures are included to illustrate certain aspects of the present disclosure, and should not be viewed as an exclusive embodiment. The subject matter disclosed is capable of considerable modification, alteration, and equivalents in form and function, as will occur to those of ordinary skill in the art and having the benefit of this disclosure.

DETAILED DESCRIPTION

Figure 1:
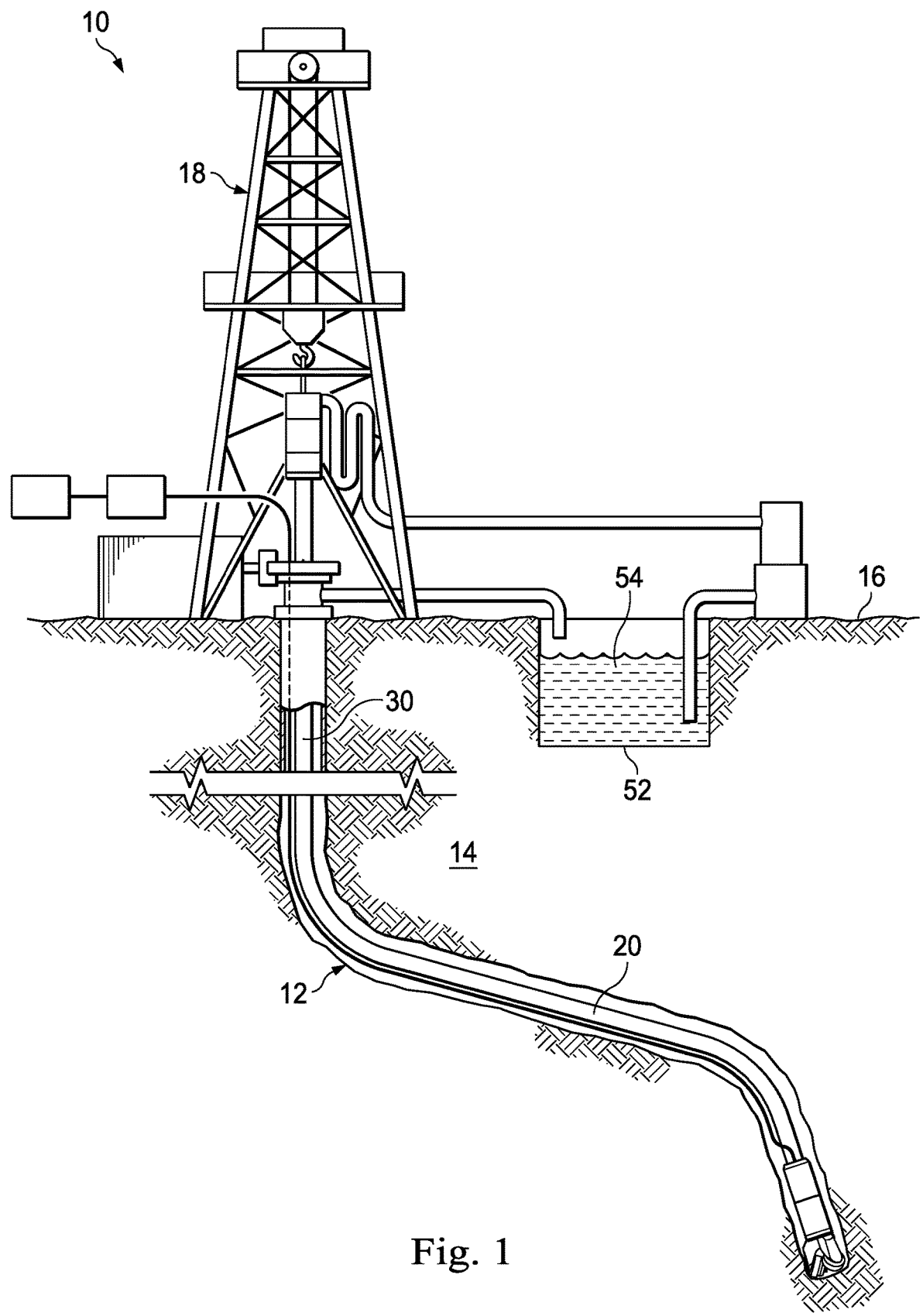
FIG. 1 illustrates a land-based drilling and production system.

According to several exemplary embodiments, the present disclosure describes geopolymer cement compositions related to the downhole synthesis of a type of polysialate geopolymer cement and polysialate geopolymer cement composite utilizing a MAHBM including core particulates coated with nanometer to micrometer size particles of a partially dehydrated and reorganized (i.e., amorphous) $C_2SH$ (e.g., $\alpha$-$C_2SH$, ($\beta$-$C_2SH$, or $\gamma$-$C_2SH$) or tricalcium silicate hydrate. As used herein, the terms "coat," "coating," "coated" or the like are not intended to imply any particular degree of coating, but rather mean that the $\alpha$-$C_2SH$ is adhered to at least some portion of the core particulates. According to several exemplary embodiments, the geopolymer cement compositions can take the place of conventional cement compositions and may be especially suitable where high compressive strength is needed.

According to several exemplary embodiments, the geopolymer cement compositions include a binder, a metal silicate, an alkaline activator, and a carrier fluid. The components of the geopolymer cement compositions react to form a geopolymer cement or a geopolymer cement composite. A geopolymer is an inorganic polymer that forms long-range, covalently bonded, non-crystalline networks. The production of a geopolymer is known as geosynthesis, a reaction process that may involve naturally occurring aluminosilicates. Geopolymers may be formed by chemical dissolution and subsequent re-condensation of various aluminosilicates and silicates to form a 3D-network or three-dimensional mineral polymer. Geopolymers based on aluminosilicates may be designated as poly(sialate), which is a shorter version of poly(silicon-oxo-aluminate). The sialate network may include silicate and aluminate tetrahedrals linked alternately by sharing all oxygens, with $Al^{3+}$ and $Si^{4+}$ in IV-fold coordination with oxygen.

Generally, geopolymer cement compositions are more flexible than typical oil-well cement compositions because many different materials can be used as geopolymer binders. For example, the binders can be locally sourced materials, low cost materials, and/or specialized materials such as fly ash, slag, cement kiln dust, metakaolin, clays, volcanic glasses, waste materials, bio-ashes, or other types of aluminosilicates.

According to several exemplary embodiments, the MAHBM functions as the binder material or as an additive for traditional geopolymer compositions. According to several exemplary embodiments, replacement of a traditional geopolymer binder with the MAHBM or use of the MAHBM as an additive to traditional geopolymer compositions yields a cement having good mechanical properties (e.g., compressive strength and strain to failure). According to several exemplary embodiments, the geopolymer cement compositions are used in a variety of subterranean applications where cement compositions may be used, including, but not limited to, primary and remedial cementing. According to several exemplary embodiments, the geopolymer cement compositions ensure wellbore integrity, and minimize the risk of isolation failures or remedial work due to faulty cement.

Advantageously, geopolymer cements formed with the MAHBM have lower carbon dioxide ($CO_2$) emissions (compared to ordinary Portland cements) since the binders are derived from natural, mined materials or waste materials. The resulting geopolymer cements also have greater strength and durability than ordinary Portland cements, and have higher acid resistance than ordinary Portland cements.

According to several exemplary embodiments, a method of cementing is provided. The method includes providing a geopolymer cement composition including a MAHBM, a metal silicate, an alkaline activator, and a carrier fluid; introducing the geopolymer cement composition into a subterranean formation; and allowing the geopolymer cement composition to set in the subterranean formation. The MAHBM includes silica or alumina core particulates that are coated with an amorphous calcium silicate hydrate, such as $C_2SH$ or tricalcium silicate hydrate. According to several exemplary embodiments, the geopolymer cement composition further includes an aluminosilicate.

According to several exemplary embodiments, the MAHBM includes crystalline silica core particulates coated with amorphous $\alpha$-$C_2SH$, and the MAHBM is present in an amount of about 5% to about 70% by weight of the geopolymer cement composition.

According to several exemplary embodiments, the metal silicate includes one or more of sodium silicate, sodium metasilicate, magnesium silicate, or potassium silicate, and the metal silicate is present in an amount of about 1% to about 80% by weight of the geopolymer cement composition.

According to several exemplary embodiments, the alkaline activator includes one or more of a metal hydroxide, ammonium hydroxide, sodium bicarbonate, sodium carbonate, lime, caustic soda, Portland cement, or hydrated lime, and the alkaline activator is present in an amount of about 1% to about 40% by weight of the geopolymer cement composition.

According to several exemplary embodiments, the carrier fluid includes one or more of freshwater, saltwater, brine, or seawater, and the carrier fluid is present in an amount of about 20% to about 95% by weight of the geopolymer cement composition.

According to several exemplary embodiments, the metal silicate includes sodium silicate, the alkaline activator includes a metal hydroxide, and the carrier fluid includes water.

According to several exemplary embodiments, the aluminosilicate, when present, includes one or more of ASTM type C fly ash, ASTM type F fly ash, ground blast furnace slag, calcined clays, partially calcined clays (such as metakaolin), aluminum-containing silica fume, natural aluminosilicate, synthetic aluminosilicate glass powder, zeolite, scoria, bentonite, or pumice, and the aluminosilicate is present in an amount of about 5% to about 50% by weight of the geopolymer cement composition.

According to several exemplary embodiments, the geopolymer cement composition further includes one or more of a fluid loss control additive, a set retarder, or a set accelerator.

According to several exemplary embodiments, introducing the geopolymer cement composition into the subterranean formation includes introducing the geopolymer cement composition into a wellbore annulus.

According to several exemplary embodiments, a geopolymer cement composition is provided. The geopolymer cement composition includes a MAHBM, a metal silicate, an alkaline activator, and a carrier fluid. The MAHBM includes silica or alumina core particulates coated with an amorphous calcium silicate hydrate such as $C_2SH$ or tricalcium silicate hydrate. According to several exemplary embodiments, the geopolymer cement composition further includes an aluminosilicate.

According to several exemplary embodiments, the MAHBM includes crystalline silica core particulates coated with amorphous a-$C_2SH$, the metal silicate includes sodium silicate, the alkaline activator includes sodium hydroxide, and the carrier fluid includes water. According to several exemplary embodiments, the crystalline silica core particulates coated with amorphous $\alpha$-$C_2SH$ are present in an amount of about 5% to about 70% by weight of the geopolymer cement composition, the sodium silicate is present in an amount of about 1% to about 80% by weight of the geopolymer cement composition, the sodium hydroxide is present in an amount of about 1% to about 40% by weight of the geopolymer cement composition, and the water is present in an amount of about 20% to about 95% by weight of the geopolymer cement composition.

According to several exemplary embodiments, the geopolymer cement composition has a compressive strength of at least about 400 psi after curing at 140° F. for about 7 days. According to several exemplary embodiments, the geopolymer cement composition has a density of at least about 10 ppg after curing at 140° F. for about 7 days.

Turning now to FIG. 1, shown is an elevation view in partial cross-section of a wellbore drilling and production system 10 utilized to produce hydrocarbons from wellbore 12 extending through various earth strata in an oil and gas formation 14 located below the earth's surface 16. Drilling and production system 10 may include a drilling rig or derrick 18 to perform various activities related to drilling or production, such as the methods described below. Likewise, drilling and production system 10 may include various types of tools or equipment 20 supported by rig 18 and disposed in wellbore 12 for performing these activities.

A working or service fluid source 52, such as a storage tank or vessel, may supply a working fluid 54 that is pumped to the upper end of tubing string 30 and flows through tubing string 30. Working fluid source 52 may supply any fluid utilized in wellbore operations, including without limitation, fracturing fluid, drilling fluid, spacer fluid, slurry, cement composition, geopolymer cement composition, acidizing fluid, liquid water, steam, hydraulic fracturing fluid, or some other type of fluid.

According to several exemplary embodiments, the geopolymer cement compositions include the MAHBM, a metal silicate, an alkaline activator, and a carrier fluid. According to several exemplary embodiments, liquid metal silicates such as sodium metasilicate, potassium silicate, or sodium silicate, can be combined with the MAHBM in the presence of a metal hydroxide to produce a geopolymer cement. Suitable metal hydroxide sources include caustic soda, Portland cement, hydrated lime, or any other alkaline material.

Figure 2:
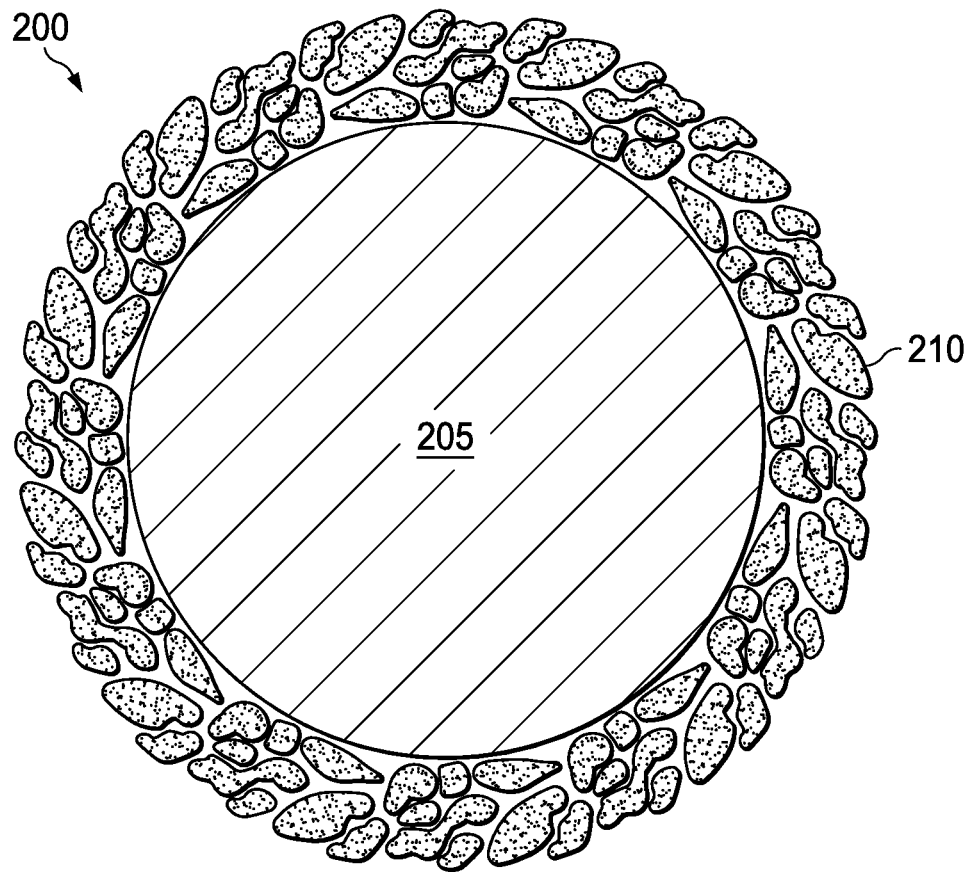
FIG. 2 illustrates an exemplary representation of a MAHBM according to one or more embodiments of the present disclosure.

Referring now to FIG. 2, shown is an exemplary representation of a MAHBM 200. As shown, the core 205 of the MAHBM is coated or surrounded by a calcium silicate hydrate such as $C_2SH$ or tricalcium silicate hydrate 210. According to several exemplary embodiments, the $C_2SH$ includes one or more of $\alpha$-$C_2SH$, $\beta$-$C_2SH$, or $\gamma$-$C_2SH$. According to several exemplary embodiments, the core 205 includes a crystalline silica (e.g., quartz), an amorphous silica (e.g., fly ash, silica fume, fumed silica, or pozzolan), or an alumina (e.g., calcium aluminate, sodium aluminate, bauxite, aluminate rich clays or minerals).

Without being bound by theory, it is believed that when water is added to the MAHBM, a hydraulic reaction occurs where calcium silicate hydrate (CSH) and calcium hydroxide $(Ca(OH)_2)$ are formed as the reaction products. The $Ca(OH)_2$ dissolves in the mix water and forms a basic, alkaline solution, which acts as an activator for geopolymer reactions. The alkaline solution is also a source of calcium (Ca), silicon (Si), and aluminum (Al) that react and form geopolymeric species by first dissolving and then reacting with the other components in the geopolymer cement composition. The fact that the $C_2SH$ or tricalcium silicate hydrate has a very small particle size, and consequently high surface area and water requirement, lead to it dissolving in basic media and thus becoming available to react quickly.

Without being bound by theory, it is believed that alumina coated with $C_2SH$ or tricalcium silicate hydrate would also have alumina available to react in addition to the Ca and Si. This would advantageously preclude the need to add any other alumina sources to the reaction mixture. Furthermore, the Si/Al ratio of the coated alumina particle could be controlled by varying the amount or thickness of the $C_2SH$ or tricalcium silicate hydrate coating. Celitement™ binder is a MAHBM that includes nano-sized to micro-sized particles of activated amorphous α-$C_2SH$ coated onto larger quartz particles (e.g., ~7-50 µs). Celitement™ binder is commercially available from Celitement™ GmbH and is marketed as a "low $CO_2$ emissions" replacement for Portland cement.

According to several exemplary embodiments, the MAHBM is present in an amount in the range of from about 5% to about 70% by weight of the geopolymer cement composition, for example about 10% to about 60%, about 15% to about 50%, or about 20% to about 45%, by weight of the geopolymer cement composition.

According to several exemplary embodiments, the metal silicate includes any suitable metal silicate. A silicate is a compound containing an anionic silicon compound. Some examples of a silicate include the orthosilicate anion also known as silicon tetroxide anion, $SiO_4^{4-}$ as well as hexafluorosilicate, $SiFe^{2-}$. Other common silicates include cyclic and single chain silicates which may have the general formula $[SiO_{2+n}]_{2n}$ and sheet-forming silicates $([SiO_{2.5}]^-)_n$. Each silicate example may have one or more metal cations associated with each silicate molecule. Some suitable metal silicates include sodium silicate, sodium metasilicate, magnesium silicate, potassium silicate, and any combination thereof. According to several exemplary embodiments, the metal silicate is present in an amount in the range of from about 1% to about 80% by weight of the geopolymer cement composition, for example about 1% to about 10%, about 10% to about 20%, about 20% to about 30%, about 30% to about 40%, about 40% to about 50%, about 50% to about 60%, about 60% to about 70%, about 70% to about 80%, or about 40% to about 80% by weight of the geopolymer cement composition.

According to several exemplary embodiments, the alkaline activator includes hydroxides (e.g., metal hydroxides or ammonium hydroxide) or carbonates such as sodium carbonate ($Na_2CO_3$). According to several exemplary embodiments, the alkaline activator includes any of a variety of suitable hydroxide sources that are capable of generating hydroxyl groups ($OH^-$) when dissolved in water. Examples of suitable hydroxide sources include sodium hydroxide, sodium bicarbonate, sodium carbonate, lime (e.g., hydrated lime), caustic soda, Portland cement, hydrated lime, and any combination thereof. According to several exemplary embodiments, the alkaline activator is present in an amount in the range of from about 1% to about 40% by weight of the geopolymer cement composition, for example about 1% to about 5%, about 5% to about 10%, about 10% to about 15%, about 15% to about 20%, about 10% to about 20%, or about 20% to about 40% by weight of the geopolymer cement composition.

According to several exemplary embodiments, the carrier fluid includes water. According to several exemplary embodiments, the water includes freshwater, saltwater (e.g., water containing one or more salts dissolved therein), brine (e.g., saturated saltwater produced from subterranean formations), seawater, or any combination thereof. Generally, the water may be from any source, provided, for example, that it does not contain an excess of compounds that may undesirably affect other components in the geopolymer cement compositions. According to several exemplary embodiments, the water is included in an amount sufficient to form a pumpable slurry. According to several exemplary embodiments, the water is present in an amount in a range of from about 20% to about 95% by weight of the geopolymer cement composition, for example about 60% to about 90% by weight of the geopolymer cement composition.

According to several exemplary embodiments, the geopolymer cement compositions further include an aluminosilicate that acts as a traditional geopolymer binder. Suitable aluminosilicates include ASTM type C fly ash, ASTM type F fly ash, ground blast furnace slag, calcined clays, partially calcined clays (such as metakaolin), aluminum-containing silica fume, natural aluminosilicate, synthetic aluminosilicate glass powder, zeolite, scoria, bentonite, pumice, and any combination thereof. According to several exemplary embodiments, the aluminosilicate, when present, is present in an amount in the range of from about 5% to about 50% by weight of the geopolymer cement composition.

According to several exemplary embodiments, the geopolymer cement compositions further include a fluid loss control additive. As used herein, the term "fluid loss control additive" refers to an additive that is used to decrease the volume of fluid that is lost to the subterranean formation. Examples of suitable fluid loss control additives include, but are not limited to, certain polymers, such as hydroxyethyl cellulose, carboxymethylhydroxyethyl cellulose, copolymers of 2-acrylamido-2-methylpropanesulfonic acid and acrylamide or N,N dimethylacrylamide, and graft copolymers including a backbone of lignin or lignite and pendant groups including at least one member selected from 2-acrylamido-2-methylpropanesulfonic acid, acrylonitrile, and N,N-dimethylacrylamide. According to several exemplary embodiments, the fluid loss control additive, when present, is present in an amount in the range of from about 0.1% to about 5% by weight of the geopolymer cement composition.

According to several exemplary embodiments, the geopolymer cement compositions further include a set retarder. As used herein, the term "set retarder" refers to an additive that is used to increase the thickening time of cement compositions. Examples of suitable set retarders include, but are not limited to, ammonium, alkali metals, alkaline earth metals, metal salts of sulfoalkylated lignins, hydroxycarboxy acids, copolymers of 2-acrylamido-2-methylpropane sulfonic acid salt and acrylic acid or maleic acid, and any combination thereof. One example of a suitable sulfoalkylated lignin includes a sulfomethylated lignin. According to several exemplary embodiments, where used, the set retarder is included in the geopolymer cement compositions in an amount sufficient to provide the desired set retardation.

According to several exemplary embodiments, the set retarder, when present, is present in an amount in the range of from about 0.1% to about 5% by weight of the geopolymer cement composition.

According to several exemplary embodiments, the geopolymer cement compositions further include a set accelerator to increase the rate of setting reactions. Control of setting time may allow for the ability to adjust to wellbore conditions or customize set times for individual jobs. Examples of suitable set accelerators may include, but are not limited to, aluminum sulfate, alums, calcium chloride, calcium sulfate, gypsum-hemihydrate, sodium aluminate, sodium carbonate, sodium chloride, sodium silicate, sodium sulfate, ferric chloride, and any combination thereof. According to several exemplary embodiments, the set accelerator, when present, is present in an amount in the range of about 0.1% to about 20% by weight of the geopolymer cement composition.

According to several exemplary embodiments, other additives suitable for use in subterranean cementing operations are added to the geopolymer cement compositions. Examples of such additives include, but are not limited to, strength retrogression additives, set accelerators, weighting agents, lightweight additives, gas generating additives, mechanical property enhancing additives, lost circulation materials, filtration control additives, foaming additives, thixotropic additives, and any combination thereof. Specific examples of these, and other, additives include crystalline silica, amorphous silica, fumed silica, salts, fibers, hydratable clays, calcined shale, vitrified shale, microspheres, fly ash, diatomaceous earth, metakaolin, ground perlite, rice husk ash, natural pozzolan, zeolite, cement kiln dust, resins, and any combination thereof. A person having ordinary skill in the art, with the benefit of this disclosure, will readily be able to determine the type and amount of additive useful for a particular application and desired result.

According to several exemplary embodiments, the components of the geopolymer cement compositions may be combined in any order desired to form a geopolymer cement composition that can be placed into a subterranean formation. In addition, the components of the geopolymer cement compositions may be combined using any mixing device compatible with the composition, including a bulk mixer, for example. According to several exemplary embodiments, a dry blend may first be formed by dry blending the dry components of the geopolymer cement composition. The dry blend may then be combined with the carrier fluid to form the geopolymer cement composition. Other suitable techniques may be used for preparation of the geopolymer cement compositions as will be appreciated by those of ordinary skill in the art with the benefit of the present disclosure.

According to several exemplary embodiments, the geopolymer cement compositions may be used in a variety of cementing operations, including surface and subterranean operations, such as primary and remedial cementing. According to several exemplary embodiments, the geopolymer cement compositions are introduced into a subterranean formation and allowed to set therein. The term "introducing" or its variations, as used herein, includes pumping, injecting, pouring, releasing, displacing, spotting, circulating, or otherwise placing a fluid or material within a well, wellbore, or subterranean formation using any suitable manner known in the art. According to several exemplary embodiments, introducing the geopolymer cement composition into a subterranean formation includes introduction into any portion of the subterranean formation, including, without limitation, into a wellbore drilled into the subterranean formation, into a near wellbore region surrounding the wellbore, or into both.

According to several exemplary embodiments, in primary cementing, the geopolymer cement compositions may be introduced into a wellbore annulus such as a space between a wall of a wellbore and a conduit (e.g., pipe strings, liners) located in the wellbore, where the wellbore penetrates the subterranean formation. The geopolymer cement composition is then allowed to set to form an annular sheath of hardened cement in the wellbore annulus. Among other things, the hardened cement formed by the set geopolymer cement composition may form a barrier, preventing the migration of fluids in the wellbore. The hardened geopolymer cement also may, for example, support the conduit in the wellbore and/or form a bond between the wellbore wall and the conduit.

According to several exemplary embodiments, in remedial cementing, the geopolymer cement compositions may be used, for example, in squeeze cementing operations or in the placement of cement plugs. By way of example, the geopolymer cement compositions may be placed in a wellbore to plug an opening, such as a void or crack, in the formation, in a gravel pack, in the conduit, in the cement sheath, and/or a microannulus between the cement sheath and the conduit or formation.

Figure 3:
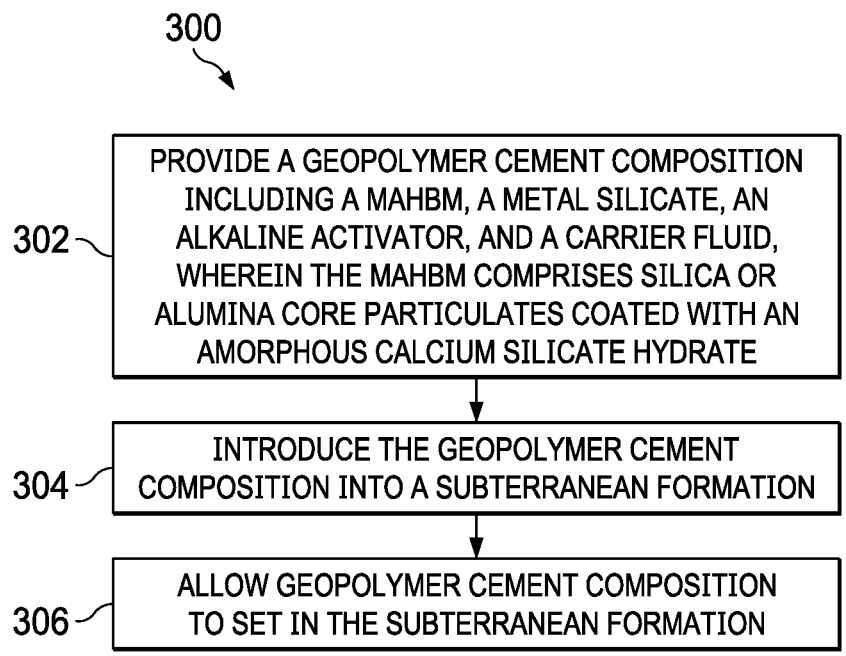
FIG. 3 depicts a method of cementing according to one or more embodiments of the present disclosure.

According to several exemplary embodiments, a method of cementing is provided. Turning now to FIG. 3, the method 300 includes providing a geopolymer cement composition including a MAHBM, a metal silicate, an alkaline activator, and a carrier fluid, wherein the MAHBM includes silica or alumina core particulates coated with an amorphous calcium silicate hydrate in step 302, introducing, for example, pumping, the geopolymer cement composition into a subterranean formation at step 304, and allowing the geopolymer cement composition to set in the subterranean formation at step 306.

According to several exemplary embodiments, while different steps, processes, and procedures are described as appearing as distinct acts, one or more of the steps, one or more of the processes, and/or one or more of the procedures may also be performed in different orders, simultaneously and/or sequentially. In one or more embodiments, the steps, processes and/or procedures may be merged into one or more steps, processes and/or procedures. In one or more embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although only a few exemplary embodiments have been described in detail above, those of ordinary skill in the art will readily appreciate that many other modifications are possible in the exemplary embodiments without materially departing from the novel teachings and advantages of the present invention. Accordingly, all such modifications are intended to be included within the scope of the present invention as defined in the following claims.

The following examples are illustrative of the geopolymer cement compositions and methods discussed above and are not intended to be limiting.

EXAMPLE 1

MAHBM Cement Slurry vs. MAHBM Geopolymer

A MAHBM including crystalline silica core particulates coated with amorphous α-$C_2SH$ was formulated as a hydraulic cement slurry according to API procedures using the formulation in Table 1 below.

TABLE 1

MAHBM Cement Slurry

| Material | Weight (g) |
| --- | --- |
| Water | 578.4 |
| MAHBM | 780.1 |
| Liquiment ® 5581F Dispersant | 7.8 |
| SA-1015 ™ Suspending Agent | 0.5 |

The slurry was then poured into 2" by 4" cylindrical molds and placed in a water bath at 140° F. After curing for 7 days, the samples were removed from the water bath, demolded, and crushed.

A MAHBM including crystalline silica core particulates coated with amorphous α-$C_2SH$ was formulated as a geopolymer slurry using the formulation in Table 2 below.

TABLE 2

Geopolymer Slurry

| Material | Weight (g) |
| --- | --- |
| Water | 578.5 |
| Sodium Silicate | 339.1 |
| NaOH | 35.9 |
| MAHBM | 864.4 |
| Sodium Aluminate | 266.0 |

The geopolymer slurry was then poured into 2" by 4" cylindrical molds and placed in a water bath at 140° F. After curing for 7 days, the samples were removed from the water bath, demolded, and crushed.

The results of the tests are shown in Table 3.

TABLE 3

Properties of MAHBM-Hydraulic Cement and MAHBM-Geopolymer Cement

| Property | MAHBM-Hydraulic Cement | MAHBM-Geopolymer Cement |
| --- | --- | --- |
| Density of set cement (ppg) | 12.9 | 12.6 |
| Compressive strength (psi) | 404 | 610 |
| Strain to Failure (%) | 0.65 | 1.18 |

The results in Table 3 indicate that the set properties of MAHBM can be greatly increased by utilizing it as a binder in geopolymer formulations. The MAHBM-geopolymer cement has 33% greater strength and 45% greater strain to failure (e.g., more elastic) than the hydraulic cement formulation. The MAHBM shows poor strength development when formulated as a traditional oil-well cement. It has, however, higher mechanical properties when formulated as a geopolymer cement.

EXAMPLE 2

A MAHBM-composite geopolymer cement composition including the conventional geopolymer aluminosilicate binder material metakaolin was prepared using the formulation below in Table 4. The MAHBM in this Example was the same material used in Example 1.

TABLE 4

MAHBM-Composite

| Material | Weight (g) |
| --- | --- |
| Water | 578.9 |
| Sodium Silicate | 28.16 |
| NaOH | 62.6 |
| MAHBM | 156.4 |
| Metakaolin | 469.45 |

The formulation was mixed and then poured into 2" by 4" cylindrical molds and placed in a water bath at 140° F. After curing for 7 days, the samples were removed from the water bath, demolded, and crushed. The results are shown in Table 5 below.

TABLE 5

Properties of MAHBM-Composite Cement

| Property | MAHBM-Composite |
| --- | --- |
| Density of set cement (ppg) | 12.6 |
| Compressive strength (psi) | 448 |

The results indicate that the MAHBM can be utilized as a composite material in geopolymer cement compositions.

What is claimed is:

1. A method of cementing, comprising:
   providing a geopolymer cement composition comprising:
   a monophase amorphous hydraulic binder material (MAHBM),
   a metal silicate,
   an alkaline activator, and
   a carrier fluid,
   wherein the MAHBM comprises core particulates coated with an amorphous calcium silicate hydrate, and the core particulates consist of calcium aluminate or sodium aluminate; and
   introducing the geopolymer cement composition into a subterranean formation; and
   allowing the geopolymer cement composition to set in the subterranean formation.

2. The method of claim 1, wherein the MAHBM is present in an amount of about 5% to about 70% by weight of the geopolymer cement composition.

3. The method of claim 2, wherein MAHBM is present in an amount of about 20% to about 45% by weight of the geopolymer cement composition.

4. The method of claim 1, wherein the metal silicate comprises one or more of sodium silicate, sodium metasilicate, magnesium silicate, or potassium silicate, and the metal silicate is present in an amount of about 1% to about 80% by weight of the geopolymer cement composition.

5. The method of claim 1, wherein the alkaline activator comprises one or more of a metal hydroxide, ammonium hydroxide, sodium bicarbonate, sodium carbonate, lime, caustic soda, Portland cement, or hydrated lime, and the alkaline activator is present in an amount of about 1% to about 40% by weight of the geopolymer cement composition.

6. The method of claim 1, wherein the carrier fluid comprises one or more of freshwater, saltwater, brine, or seawater, and the carrier fluid is present in an amount of about 20% to about 95% by weight of the geopolymer cement composition.

7. The method of claim 1, wherein the metal silicate comprises sodium silicate, the alkaline activator comprises a metal hydroxide, and the carrier fluid comprises water.

8. The method of claim 1, wherein the geopolymer cement composition further comprises one or more of a fluid loss control additive, a set retarder, or a set accelerator.

9. The method of claim 8, wherein the geopolymer cement composition further comprises the fluid loss control additive, and the fluid loss control additive is present in an amount of about 0.1% to about 5% by weight of the geopolymer cement composition.

10. The method of claim 8, wherein the geopolymer cement composition further comprises the set retarder, and the set retarder is present in an amount of about 0.1% to about 5% by weight of the geopolymer cement composition.

11. The method of claim 1, wherein introducing the geopolymer cement composition into the subterranean formation comprises introducing the geopolymer cement composition into a wellbore annulus.

12. A method of cementing, comprising:
providing a geopolymer cement composition comprising:
a monophase amorphous hydraulic binder material (MAHBM),
an aluminosilicate,
a metal silicate,
an alkaline activator, and
a carrier fluid,
wherein the MAHBM comprises core particulates coated with an amorphous calcium silicate hydrate, and the core particulates consist of calcium aluminate or sodium aluminate;
introducing the geopolymer cement composition into a subterranean formation; and
allowing the geopolymer cement composition to set in the subterranean formation.

13. The method of claim 12, wherein the MAHBM is present in an amount of about 5% to about 70% by weight of the geopolymer cement composition.

14. The method of claim 13, wherein MAHBM is present in an amount of about 20% to about 45% by weight of the geopolymer cement composition.

15. The method of claim 12, wherein the aluminosilicate comprises one or more of ASTM type C fly ash, ASTM type F fly ash, ground blast furnace slag, calcined clays, partially calcined clays, aluminum-containing silica fume, natural aluminosilicate, synthetic aluminosilicate glass powder, zeolite, scoria, bentonite, or pumice, and the aluminosilicate is present in an amount of about 5% to about 50% by weight of the geopolymer cement composition.

16. The method of claim 12, wherein the metal silicate comprises one or more of sodium silicate, sodium metasilicate, magnesium silicate, or potassium silicate, and the metal silicate is present in an amount of about 1% to about 80% by weight of the geopolymer cement composition.

17. The method of claim 12, wherein the alkaline activator comprises one or more of a metal hydroxide, ammonium hydroxide, sodium bicarbonate, sodium carbonate, lime, caustic soda, Portland cement, or hydrated lime, and the alkaline activator is present in an amount of about 1% to about 20% by weight of the geopolymer cement composition.

18. The method of claim 12, wherein the carrier fluid comprises one or more of freshwater, saltwater, brine, or seawater, and the carrier fluid is present in an amount of about 40% to about 95% by weight of the geopolymer cement composition.

* * * * *